Patented Apr. 28, 1942

2,280,842

UNITED STATES PATENT OFFICE 2,280,842

METHOD OF ISOLATING FATTY ACIDS FROM TALL OIL

Anthony F. Oliver and Robert C. Palmer, Pensacola, Fla., assignors to Newport Industries, Inc., Pensacola, Fla., a corporation of Delaware No Drawing. Application November 15, 1939, Serial No. 304,580

12 Claims. (Cl. 260—97.5)

This invention relates to a method of isolating fatty acids from tall oil. More particularly the invention pertains to a method of preparing hard fatty acids from tall oil.

Tall oil is a by-product in the manufacture of paper pulp by digestion of wood with alkaline liquors, in particular, aqueous alkaline solutions of sodium sulfide. The crude tall oil thus produced is a dark evil smelling liquid consisting of a mixture of roughly equal proportions of largely unsaturated fatty acids, such as oleic acid, and resin acids together with minor proportions of unsaponifiable matter, chiefly plant sterols. The evil smell is thought to be due to sulfur compounds also present in the crude tall oil.

It has heretofore been proposed to isolate, in more or less pure form, the commercially valuable fatty acids and resin acids present in tall oil. Among the methods proposed for this purpose may be mentioned fractional crystallization, fractional distillation in vacuum or with superheated steam, selective extraction, selective esterification and like methods. However, none of the proposed methods have proved commercially successful.

We have discovered that commercially valuable hard fatty acids and abietic acid may be isolated from tall oil by a method comprising an initial hydrogenation followed by a fractional crystallization.

It is therefore an object of the present invention to provide a method of isolating, from tall oil, fatty acids and abietic acid in commercially pure form.

A more specific object of this invention is to provide a method of isolating hard fatty acids as well as abietic acid from tall oil by a process comprising an initial hydrogenation and a subsequent fractional crystallization.

Other and further objects of this invention will become apparent from the following description and appended claims.

Hydrogenation according to the present invention is suitably preceded by a purification of the tall oil, to remove oxidized bodies and sulfur compounds present in crude tall oil which render conventional hydrogenating methods inoperative. This purifying step may take the form of an initial treatment with absorbent clay, activated charcoal or fuller's earth, a subsequent heat treatment at a temperature above 250° C. and below the temperature at which decomposition occurs, and a final treatment with a heavy metal compound capable of reacting with hydrogen sulfide to form sulfides insoluble in tall oil.

Crude tall oil, dissolved in a solvent such as petroleum naphtha, may, for instance, be filtered through an amount, by weight, of fuller's earth at least equal to the amount of tall oil being treated whereby substantially all oxidized bodies and a major proportion of the sulfur compounds are removed. Certain solid insoluble color bodies amounting to about 1.5 per cent, by weight, of the crude tall oil are precipitated from the initial petroleum solution and may be separated by decantation prior to the treatment with fuller's earth. The extent of desulfurization effected can be controlled in some measure by the amount of fuller's earth used, although complete desulfurization is practically impossible by this means alone. A suitable ratio of fuller's earth to tall oil is two parts to one. Such treatment of an 18 per cent solution of crude tall oil gives, after removal of the solvent, an 80 per cent yield of pale, nearly odorless tall oil. The 20 per cent of the crude tall oil retained by the fuller's earth consists of a black, evil smelling liquid somewhat more viscous than the crude tall oil and containing a major portion of the sulfur present in the crude tall oil.

The following analyses will illustrate the effect of the hereinabove outlined illustrative treatment with fuller's earth of a solution of tall oil in petroleum naphtha:

Crude tall oil

| | |
|---|---|
| Specific gravity at 25° C. | 0.980 |
| Acid value | 167.2 |
| Color (Hellige Klett scale) | 9L–9 |
| Viscosity (Gardner Holt scale) | Q |
| Percent fatty acids | 52.2 |
| Percent resin acids | 38.8 |
| Per cent naphtha insoluble | 1.5 |

Tall oil treated with 2 parts fuller's earth

| | |
|---|---|
| Percent yield | 80.0 |
| Acid value | 173.0 |
| Color (Hellige Klett scale) | 4L |
| Viscosity (Gardner Holt scale) | M |
| Saponification value | 178.5 |
| Ester value | 5.5 |
| Per cent unsaponifiable matter | 6.5 |
| Per cent resin acids | 37.5 |
| Per cent fatty acids | 53.0 |
| Specific rotation | —12° |
| Per cent bound sulfur | 0.02 |

During the then following heat treatment step, a large part of the residual sulfur is eliminated as hydrogen sulfide. A marked bleaching is simultaneously effected.

In general, the heat treatment is carried out at a temperature of from 260° to 300° C., and in some cases as high as 325° C. for a period of time ranging from 8 hours to 2 hours or 1 hour, and in some cases for a period as short as ten minutes. Roughly speaking, the duration of the heat treatment of the tall oil in this step is inversely proportional to the temperature. In any case, the heat treatment is prolonged sufficiently to eliminate as hydrogen sulfide a substantial fraction of the sulfur present in the tall oil. A heat treatment at ½ hour at 280° C. to 285° C. suffices in many cases.

All fuller's earth should be completely removed from therewith treated tall oil prior to heat treatment.

If desired, the heat treated tall oil may be steamed, to insure more complete removal of hydrogen sulfide formed during the heat treatment.

Not all residual sulfur is removed by heat treatment or even by combined heat treatment and steaming. The last traces of sulfur may, however, be removed by treatment at elevated temperatures with compounds of heavy metals capable of reacting with hydrogen sulfide to form sulfides insoluble in tall oil. On addition of the metallic compound the oil turns black. The metallic sulfides formed may easily be removed by cooling, for instance, to 100° C. or thereabouts, and filtering through a thin bed of fuller's earth or other filter media such as activated carbon, "Filtercel" and like materials capable of removing suspended or dissolved metallic compounds. Specific metallic compounds adapted for removal of sulfur include copper and nickel formates (suitably in amounts equal to about 0.1 per cent of the tall oil being treated) as well as litharge. Complete subsequent removal of excess of the latter is necessary to prevent poisoning of the hydrogenation catalyst.

Obviously the specified intensities of treatment with fuller's earth, with heat, and with heavy metal compounds capable of reacting with hydrogen sulfide may be varied to some extent provided that a less intense form of one treatment is compensated for by increasing the intensity of another complementary step.

Tall oil thus subjected to treatment with fuller's earth, heat, and heavy metal compounds capable of reacting with hydrogen sulfide is substantially completely desulfurized and thereby made suitable for hydrogenation according to conventional methods. Other equivalent modes of effecting desulfurization will suggest themselves to those skilled in the art.

Hydrogenation of desulfurized tall oil, however it may have been desulfurized, is effected in the liquid phase, under pressure, by means of conventional hydrogenation catalysts. Suitable conditions include hydrogen pressures up to 300 pounds per square inch and temperatures ranging from 85° C. and 90° C. to 125° C., with a maximum suitable temperature of 150° C. to 160° C. These conditions may be realized by the use of an electrically heated stainless steel bomb. The catalyst may consist of mixed suboxides of copper and nickel formed from about 20 grams of mixed copper-nickel (3:1) formates per 300 grams desulfurized tall oil. If desired, an inert solvent may be added.

Under these conditions, absorption of hydrogen commences at a temperature of about 85° C. to 90° C. and becomes rapid at about 100° C. to 110° C. Most hydrogen is absorbed during the first hour of operation. The desired substantially complete hydrogenation of the fatty acids is usually effected under the above conditions in 6 to 8 hours, about 1.5 gram molecules of hydrogen being consumed for each 300 grams of tall oil.

This substantially complete hydrogenation of the desulfurized tall oil changes the latter from a liquid to a solid, yellowish white mass having a titre of approximately 50° C. This hydrogenated tall oil contains traces of metallic compounds which may be removed by solution in naphtha and shaking the warmed naphtha solution with dilute sulfuric acid. The hydrogenated tall oil may also be melted and filtered, at a temperature of about 100° C., through a thin bed of fuller's earth or other filter media which will absorb the small amounts of metallic compounds dissolved and remove the suspended catalyst.

Hardened fatty acids are then separated from the demetallized hydrogenated tall oil by a fractional crystallization. The hydrogenated tall oil may, for instance, be dissolved in petroleum naphtha in amounts of about 120 grams per liter, and the solution is cooled to 0° C. and held there for several hours. A copious, granular or somewhat gelatinous precipitate of hard fatty acids is produced. This precipitate is filtered off and dried as much as possible by suction through the filter medium. Considerable amounts of solvent, however, are tenaciously retained by the hardened fatty acids. For the purpose of removing this retained solvent the filter cake is removed from the filter medium, placed in a retort and steamed at about 150° C. The product is a fairly pure grade of stearic acid having an acid value of 185 to 190 and a titre of 62° C. amounting to about 50 per cent of the hydrogenated tall oil.

This fractional crystallization may be carried out in other solvents, for instance, methyl and ethyl alcohols, ethyl acetate, ethyl ether, acetone, 2-nitro-1-butanol, chloroform, ethylene dichloride, toluene or mixtures of such solvents with each other or with petroleum naphtha. In the case of the seven first solvents mentioned, cooling to room temperatures suffices to induce fractional crystallization of stearic acid.

Separation can also be effected by fractional crystallization without the use of any solvent and by fractional distillation in vacuum.

The filtrate from the fractional crystallization contains any unsaturated fatty acids still present, a minor fraction of the hardened fatty acids, resin acids and unsaponifiable matter. This filtrate may optionally be purified with fuller's earth and thereafter subjected to a vacuum distillation to isolate the above mentioned components thereof.

After removal of the solvent contained therein, the filtrate may, for instance, be subjected to distillation in a pot still at an absolute pressure of 4 to 6 mm. of mercury, no fractionation column being necessary. The first fraction of the distillate, amounting to 35 per cent of the oil being distilled, has an acid value of 162 and on cooling deposits a precipitate of hard fatty acids amounting to about 6 per cent of the hydrogenated tall oil. The total yield of 90 to 95 per cent pure hard fatty acids obtained is therefore about 56 per cent of the hydrogenated tall oil, or about 45 per cent of the crude tall oil.

The remainder of the initial fraction of the distillate consists largely of hydrogenated abietic acid as does also the nearly colorless middle fraction of the distillate. Such hydrogenated abietic acid has an iodine value of about 16 to 20. Said middle fraction amounts to about 55 per cent of the oil being distilled and has an acid value of 177. The middle fraction, when dissolved to 80 per cent concentration in petroleum naphtha and allowed to stand yields a heavy crystalline precipitate of hydrogenated abietic acid having an acid value of 183.5 and a capillary melting point of 48° C. The crystals filtered off amount to 27.5 per cent of the distillate, or about 11 per cent of the crude tall oil. About 10 per cent of similarly pure hydrogenated abietic acid may be obtained in like manner from the residue remaining after removal of precipitated hard fatty acids from the initial fraction of the distillate. The total recovery of abietic acid from the crude tall oil thus amounts to about 21 per cent.

About 10 per cent of the oil from the filtrate remains in the still as brown viscous oil soluble in toluene but insoluble in alcohol. This oil has an acid value of 73 and contains 46.5 per cent unsaponifiable matter.

The following table lists, as an illustrative example, the results obtainable by hydrogenating, under the conditions disclosed hereinabove, tall oil treated with twice its weight of fuller's earth and further subjected to heat treatment and removal of residual traces of sulfur with litharge, all excess lead being removed prior to hydrogenation:

| | |
|---|---|
| Per cent yield hard fatty acids | 50 |
| Acid value of hard fatty acids | 190 |
| Titre of hard fatty acids, in °C | 62.5 |
| Per cent fatty acids in hard fatty acids (Twitchell) | 94 |
| Per cent solvent occluded by hard fatty acid matrix | 56.5 |
| Per cent residue recoverable from filtrate after recovery of hard fatty acids | 50.0 |
| Acid value of residue | 155 |
| Per cent fatty acids in residue | 26.5 |
| Per cent resin acids in residue | 55.5 |
| Per cent unsaponifiable in residue | 18.0 |

The hereinabove disclosed principles and examples show that our invention comprises, broadly speaking, the hydrogenation of tall oil, to effect the formation of a mixture of hydrogenated resin acids and hard fatty acids from which commercially valuable hard fatty acids may be isolated by physical means with far greater ease than is the case in the isolation of largely unsaturated fatty acids from crude tall oil. In particular, hard fatty acids may be isolated from hydrogenated tall oil by fractional distillation and by fractional crystallization, if desired, from solvents such as aliphatic and aromatic hydrocarbons and chlorinated derivatives thereof, aliphatic alcohols, esters, ethers, ketones and the like or their mixtures. Our invention further comprises the step of facilitating hydrogenation according to conventional commercial methods by an initial substantially complete removal of oxidized bodies from and desulfurization of the crude tall oil.

We are aware that numerous details of the present invention may be varied through a wide range without departing from the principles of this invention, and we, therefore, do not purpose limiting the patent granted hereon otherwise than necessitated by the appended claims.

We claim as our invention:

1. A method of preparing stearic acid from tall oil comprising desulfurizing and removing oxidized bodies from said tall oil, hydrogenating the desulfurized tall oil substantially completely and separating stearic acid from the hydrogenated desulfurized tall oil by fractional crystallization.

2. A method of preparing stearic acid from tall oil comprising desulfurizing and removing oxidized bodies from said tall oil, hydrogenating the desulfurized tall oil substantially completely and separating stearic acid from the hydrogenated desulfurized tall oil by fractional distillation.

3. A method of preparing stearic acid from tall oil comprising desulfurizing and removing oxidized bodies from said tall oil, substantially completely hydrogenating the desulfurized tall oil, dissolving the hydrogenated tall oil in a solvent, and cooling the resulting solution to effect a precipitation of stearic acid.

4. A method of preparing stearic acid from tall oil comprising desulfurizing and removing oxidized bodies from said tall oil, substantially completely hydrogenating the desulfurized tall oil, dissolving the hydrogenated tall oil in a solvent, cooling the resulting solution to effect a precipitation of stearic acid, and filtering off the precipitate of stearic acid.

5. A method of preparing stearic acid from tall oil comprising desulfurizing and removing oxidized bodies from said tall oil, substantially completely hydrogenating the desulfurized tall oil, dissolving the hydrogenated tall oil in a solvent, cooling the resulting solution to effect a precipitation of stearic acid, filtering off the precipitate of stearic acid, and removing the solvent from said filtrate, distilling the resulting residue in vacuum, collecting an initial fraction of the distillate comprising substantially all the remaining stearic acid and separating stearic acid from said initial fraction by fractional crystallization.

6. A method of preparing stearic acid from tall oil comprising filtering said tall oil through at least its own weight of fuller's earth, heating the thus treated tall oil at a temperature ranging from 260° C. to 325° C. for a time sufficient to effect a substantial evolution of hydrogen sulfide, contacting thus heat treated tall oil at an elevated temperature with a heavy metal compound capable of reacting with hydrogen sulfide, to remove any sulfur still present after treatment with fuller's earth and heat, hydrogenating the thus desulfurized tall oil to effect substantially complete saturation of fatty acids contained therein, and isolating stearic acid from the hydrogenated tall oil by fractional crystallization.

7. A method of preparing stearic acid from tall oil comprising removing oxidized bodies from and desulfurizing said tall oil, hydrogenating the desulfurized tall oil at a temperature of between 85° C. and 125° C. to effect substantially complete saturation of fatty acids contained therein, dissolving the hydrogenated tall oil in a solvent, and cooling the resulting solution to precipitate stearic acid therefrom.

8. A method of preparing stearic acid from tall oil comprising removing oxidized bodies from and desulfurizing said tall oil, hydrogenating the desulfurized tall oil at a temperature of between 85° C. to 160° C. to effect the absorption of about 1 part by weight of hydrogen for each 100 parts of tall oil, dissolving the hydrogenated tall oil in a liquid aliphatic hydrocarbon, and separating stearic acid from the resulting solution by fractional crystallization.

9. A method of preparing stearic acid from tall oil comprising removing oxidized bodies from and desulfurizing said tall oil, substantially completely hydrogenating the desulfurized tall oil with a catalyst comprising suboxides of copper and nickel, removing dissolved and suspended catalyst, dissolving the hydrogenated tall oil in a solvent and cooling the resulting solution to precipitate stearic acid therefrom.

10. A method of preparing stearic acid from tall oil comprising desulfurizing the tall oil, hydrogenating the tall oil to effect substantially complete saturation of the fatty acids contained therein and separating stearic acid from the hydrogenated tall oil.

11. A method of preparing stearic acid from tall oil comprising desulfurizing the tall oil, hydrogenating the desulfurized tall oil to effect substantially complete saturation of fatty acids contained therein, and separating stearic acid from the hydrogenated tall oil by fractional crystallization.

12. A method of preparing stearic acid from tall oil comprising desulfurizing the tall oil, hydrogenating the desulfurized tall oil to effect substantially complete saturation of fatty acids contained therein, and separating stearic acid from the hydrogenated tall oil by fractional crystallization in a solvent.

ANTHONY F. OLIVER.
ROBERT C. PALMER.